(12) United States Patent
Cammack et al.

(10) Patent No.: US 7,332,477 B2
(45) Date of Patent: Feb. 19, 2008

(54) PHOTOCLEAVABLE DNA TRANSFER AGENT

(75) Inventors: J. Kevin Cammack, Oceanside, CA (US); Sang Van, San Diego, CA (US); Peng Wang, Vista, CA (US)

(73) Assignee: Nitto Denko Corporation, Osaka (JP)

( * ) Notice: Subject to any disclaimer, the term of this patent is extended or adjusted under 35 U.S.C. 154(b) by 286 days.

(21) Appl. No.: 10/884,530

(22) Filed: Jul. 2, 2004

(65) Prior Publication Data

US 2005/0037401 A1 Feb. 17, 2005

Related U.S. Application Data

(60) Provisional application No. 60/486,390, filed on Jul. 10, 2003.

(51) Int. Cl.
| | |
|---|---|
| A61K 48/00 | (2006.01) |
| A61K 31/74 | (2006.01) |
| A61K 38/00 | (2006.01) |
| A61K 38/02 | (2006.01) |
| G03C 1/52 | (2006.01) |
| G03C 1/30 | (2006.01) |
| C12N 15/63 | (2006.01) |
| A01N 43/66 | (2006.01) |
| C08F 2/46 | (2006.01) |
| C08F 2/50 | (2006.01) |
| C08J 3/28 | (2006.01) |
| C07D 413/00 | (2006.01) |
| C07H 19/12 | (2006.01) |
| C07C 245/00 | (2006.01) |
| C09B 67/00 | (2006.01) |

(52) U.S. Cl. .............. 514/44; 424/78.18; 430/157; 430/175; 430/626; 435/320.1; 514/246; 522/6; 522/32; 530/300; 536/23.1; 536/28.3; 544/83; 544/113; 534/558; 8/550

(58) Field of Classification Search ................. None
See application file for complete search history.

(56) References Cited

U.S. PATENT DOCUMENTS

| 6,350,431 | B1 * | 2/2002 | Snow et al. ................. 424/9.6 |
| 6,534,243 | B1 | 3/2003 | Templeton et al. |
| 6,680,301 | B2 * | 1/2004 | Berg et al. ..................... 514/44 |
| 6,878,374 | B2 | 4/2005 | Yu et al. |
| 2002/0082362 | A1 * | 6/2002 | Brocchini et al. .......... 525/461 |
| 2003/0186916 | A1 | 10/2003 | Yu et al. |
| 2003/0191458 | A1 * | 10/2003 | Diamond et al. ............. 606/14 |
| 2003/0194649 | A1 * | 10/2003 | Matsumura ............... 430/281.1 |
| 2003/0215395 | A1 | 11/2003 | Yu et al. |
| 2005/0049387 | A1 | 3/2005 | Van et al. |
| 2005/0080033 | A1 | 4/2005 | Van et al. |
| 2005/0089503 | A1 | 4/2005 | Li et al. |

FOREIGN PATENT DOCUMENTS

| WO | WO 99/22770 | 5/1999 |
| WO | WO 01/32720 | 5/2001 |
| WO | WO0132720 A1 * | 5/2001 |
| WO | WO 03/097107 | 11/2003 |

OTHER PUBLICATIONS

Ichimura et al (Photosensitive Resins Containg p-Dimethylaminobenzylidene Derivatives and Diphenyliodonium Salt as Photoinitiators. Journal of Applied Polymer Sciences, 1987. 34:2747-2756).*
U.S. Appl. No. 11/126,878, filed May 10, 2005. the inventors are Sang Van, Hyun Sik Chae and Lei Yu.
U.S. Appl. No. 11/134,820, filed May 19, 2005. the inventors are Sang Van and Lei Yu.
U.S. Appl. No. 60/615,764, filed Oct. 4, 2004. See USPTO Image File Wrapper.
U.S. Appl. No. 60/662,612, filed Mar. 16, 2005. See USPTO Image File Wrapper.
U.S. Appl. No. 60/662,617, filed Mar. 16, 2005. See USPTO Image File Wrapper.
Carey, F.A. and Sundberg, R.J., *Advanced Organic Chemistry: Structure and Mechanisms*, Plenum Press, New York, 1990, pp. 442-446.
Luo, D. & Saltzman, W. M. Synthetic DNA delivery systems. Nat. Biotechnol. 18, 33-37 (2000).
Saeva, F.D. and B.P. Morgan (1984) J. Am. Chem. Soc. 106: 4121.
Shirai, M. and Tsunooka, M., "Photoacid and photobase generators: chemistry and applications to polymeric materials" Prog. Polym. Sci. vol. 21 pp. 1-45, 1996.
Tomlinson, R. et al., "Pendent Chain Functionalized Polyacetals That Display pH-Dependent Degradation: A platform for the Development of Novel Polymer Therapeutics," Macromolecules 35, 473-480 (2002).
U.S. Appl. No. 10/375,705, filed Feb. 25, 2003.

* cited by examiner

*Primary Examiner*—Daniel M. Sullivan
*Assistant Examiner*—Kimberly A Makar
(74) *Attorney, Agent, or Firm*—Knobbe Martens Olson & Bear LLP

(57) ABSTRACT

The present invention provides visible light sensitive and ultraviolet (UV) light sensitive composition for DNA transfer comprising acid sensitive polyacetals developed as DNA/RNA delivery agents, a photoacid generator and optionally a photosensitizer.

22 Claims, 2 Drawing Sheets

PHOTOCLEAVABLE DNA TRANSFER AGENT

RELATED APPLICATION INFORMATION

This application claims priority to U.S. Provisional Application Ser. No. 60/486,390, filed Jul. 10, 2003, which is hereby incorporated by reference in its entirety.

BACKGROUND OF THE INVENTION

1. Field of the Invention

The present invention relates to drug delivery agents that can be (de)activated by visible or infrared light, and in particular to photocleavable and/or photodirectable drug, DNA, protein and RNA delivery agents.

2. Description of the Related Art

Photodynamic (PD) delivery is the control of the delivery of a bioactive agent with light. PD therapeutics normally fall into two classes: photosensitive drugs that decompose into reactive species (as with tetracycline) and photosensitive prodrugs that undergo a "photodecaging" reaction to give the active drug when irradiated with light. Gene-transfer therapy typically involves the insertion of working copies of genes into cells in which they are not adequately expressed for some reason. While tools for the photodynamic delivery of small molecule drugs are available, existing tools for the photodynamic delivery of large biomolecules such as DNA are inadequate. Thus it is desirable to develop photodynamic agents for DNA delivery.

SUMMARY OF THE INVENTION

A preferred embodiment provides a photocleavable DNA transfer composition comprising: an acid sensitive gene transfer agent, a photoacid generator, and a bioactive agent selected from the group consisting of polynucleotide and polypeptide.

These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF THE PREFERRED EMBODIMENTS

Definitions

Figure 1:
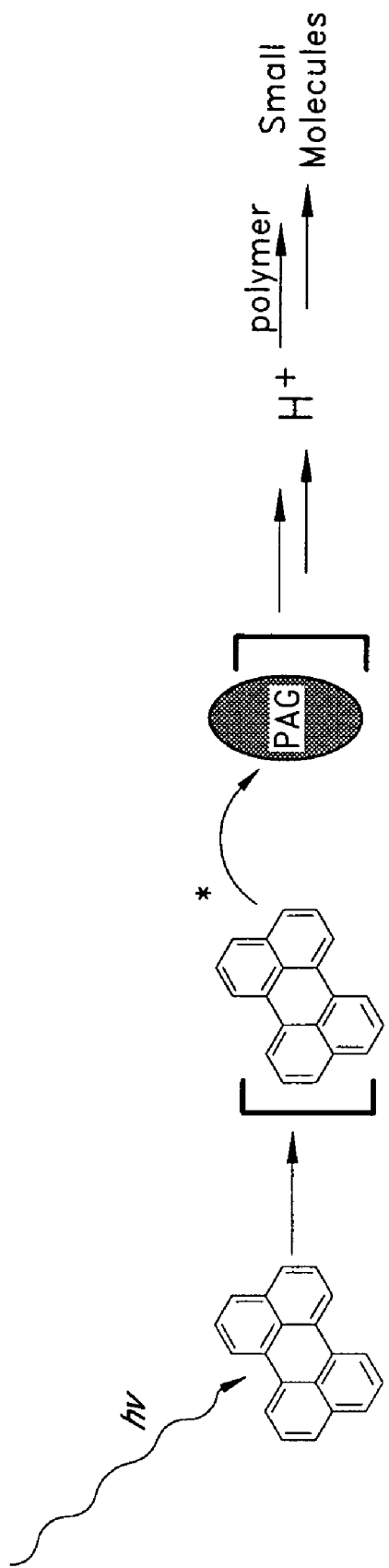
FIG. 1 depicts visible light induced cleavage of polymer gene transfer agents using the poly aromatic hydrocarbon (PAH) perylene as a visible sensitizer.

Polymer: A natural or synthetic compound typically comprising more than about 10 repeat units of some smaller compound or compounds covalently bound together. The term polymer thus includes without limitation copolymers (e.g., random, block and graft copolymers) and oligomers. Molecular weights of polymers are weight average ($M_w$) unless otherwise stated.

A "photocleavable" material is one that undergoes degradation and/or a reduction in molecular weight upon exposure to light having a wavelength in the range of about 250 nm to about 1000 nm.

Cation: A cation is a positively charged ion. Large molecules and polymers may contain covalently attached subunits comprising cationic functional groups. Cationic functional groups commonly attached to organic compounds and polymers are known to those skilled in the art and may include, for example, protonated amines and tetraalkyl ammoniums. Hereinafter, cationic functional groups as well as molecules and repeat units comprising a cationic functional group may be referred to as cations. Polymer cations may also be referred to as polycations.

Anion: An anion is a negatively charged anion. Large molecules and polymers may contain covalently attached subunits comprising anionic functional groups. Anionic functional groups commonly attached to organic compounds and polymers are known to those skilled in the art and may include, for example, phosphate, carboxylate, and sulfonate groups. Hereinafter, anionic functional groups as well as molecules and repeat units comprising an anionic functional group are referred to as anions. Polymer anions may also be referred to as polyanions.

Polypeptide: A polypeptide is a polymer wherein the repeat units largely comprise amino acids and the total number of amino acids is less than about 100.

Polycation: A polycation is a polymer with one or more repeat units comprising a cation.

Protein: A protein is a polymer wherein the repeat units largely comprise amino acids and the total number of amino acids is greater than about 100.

Acetal: Acetal is used herein to refer to compounds containing acetal and/or ketal functional groups. Acetal and ketal functional groups have the general structures A and B shown below, respectively, where $R_{1-4}$ are independently chosen from the group consisting of H, alkyl, aryl, heteroalkyl and heteroaryl. A more complete description of acetals and ketals can be found in F. A. Carey and R. J. Sundberg, *Advanced Organic Chemistry: Structure and Mechanisms*, Plenum Press, New York, 1990, pp 442-446; which is hereby incorporated by reference.

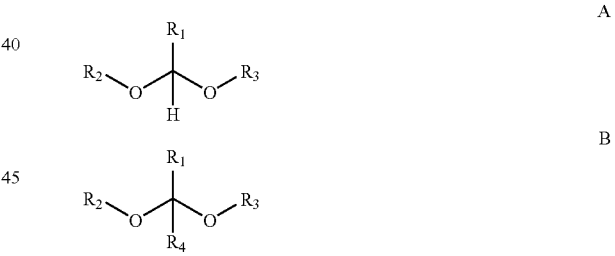

Polyacetal: A polyacetal is a polymer with repeat units comprising an acetal.

Cytotoxicity: Of, relating to, or producing a toxic effect on cells.

Transfection: The introduction of target DNA into a recipient eukaryote cell.

Transfection efficiency: The percentage of growing eukaryote cells which show the expected effects of transfection in a group of cells that has been subjected to DNA transfection conditions. Transfection efficiency may refer to either gene expression or suppression due to transfected DNA.

Those skilled in the art will understand that terms such as DNA transfection, DNA transfer compositions, DNA transfer agents, gene transfer agents, etc., may be used herein to refer to compositions and/or processes involving a variety of bioactive agents such as DNA, RNA, polypeptides, and proteins. Thus, in these contexts, the term "DNA" will be understood as a reference to the various bioactive agents discussed herein, including polynucleotides (e.g., DNA and RNA), polypeptides, and proteins.

Preferred embodiments provide a novel, photosensitive DNA-transfection agent with high transfection efficiency, low cytotoxicity and high sensitivity to visible light (greater than 410 nm). In other preferred embodiments, a photoacid generator (PAG), acid-sensitive gene-transfer agent, optionally a photosensitizer, and a bioactive agent are combined to form a photocleavable DNA transfer composition. Controlled release of the bioactive agent from the photocleavable DNA transfer composition is preferably effected by exposure to visible light of the correct energy (which depends on the properties of the PAG and photosensitizer, if present). In preferred embodiments, the acid sensitive gene transfer agent comprises an acid sensitive polymer.

A great deal of recent work has gone into the development of polymeric DNA transfer agents having desirable properties such as low immunogenicity, amenable to production on a relatively large scale, and which can be easily modified to provide a range of biological properties. See Luo, D. & Saltzman, W. M. Synthetic DNA delivery systems. Nat. Biotechnol. 18, 33-37 (2000). Acid sensitive polymer systems have been reported for therapeutic purposes, see Tomlinson, R. et al., "Pendent Chain Functionalized Polyacetals That Display pH-Dependent Degradation: A platform for the Development of Novel Polymer Therapeutics," Macromolecules 35, 473-480 (2002). Specific examples of acid sensitive gene transfer agents with low cytotoxicity's and high transfection efficiencies are given in U.S. patent application Ser. No. 10/375,705, filed Feb. 25, 2003, which is hereby incorporated by reference.

Gene-transfer agents are materials or compositions which allow or improve the movement of DNA from the extracellular matrix into the intracellular fluid, and which preferably, in the case of introduced genetic material, ultimately allow the expression of that genetic material. While this invention is not bound by theory, it is generally believed to be preferable for the gene-transfer agent to form a complex with the extracellular DNA or otherwise bind to the DNA. For example, DNA itself is polymeric and can be characterized by the presence of pendant anionic phosphate groups. Thus DNA is generally considered to be polyanionic. Those skilled in the art will understand that there are a number of classes of materials which qualify as gene-transfer agents. These classes of gene-transfer agents include: naked DNA (i.e., DNA which is simply dissolved in the extracellular fluid and otherwise unmodified and unpackaged); polymers; viruses; proteins; cationic polypeptides; calcium phosphate ($CaPO_4$); cationic lipids; and other polycations.

Acid-sensitive gene-transfer agents are gene transfer agents that undergo chemical modification by acid. For example, water soluble acid sensitive polymers are a preferred class of acid sensitive gene transfer agents that undergo chain cleavage under appropriate acidic conditions. Water-soluble acid sensitive polymers are preferably selected from the group consisting of: acid-sensitive cationic polypeptides; acid-sensitive proteins; and acid-sensitive polycations. In a preferred embodiment, acid-sensitivity is provided by incorporation of an acid-cleavable linkage segment in the water-soluble acid sensitive polymer. In a further preferred embodiment, the acid-cleavable segment is an acetal or ketal group.

In an example of a preferred embodiment, an acid sensitive gene-transfer agent comprises a copolymer containing an acid sensitive repeat unit and a cationic repeat unit with a covalent connection to one another. The copolymer may take the form of a graft copolymer, side-chain copolymer, random copolymer, block copolymer, dendrimer, or crosslinked copolymer. Preparation methods for various types of acid sensitive copolymers are known to those skilled in the art. A more complete description of copolymers and their preparation may be found in C. E. Carraher, Polymer Chemistry, 5$^{th}$ ed., Marcel Dekker, New York, 2000, pp 358-388, which is hereby incorporated by reference.

Organic amines and amine containing compounds are typically basic and therefore form cations when dissolved in neutral or acidic water. Organic amines may also be rendered cationic by quaternization. The cationic repeat unit preferably contains an organic amine, and is preferably chosen from the group consisting of primary alkyl amine, secondary alkyl amine, tertiary alkyl amine, alkyl ammonium, arginine, asparagine, glutamine, histidine, lysine and proline.

In a preferred embodiment, an acid sensitive gene-transfer agent comprises a copolymer comprising or consisting essentially of one or more of the acetal repeat units represented by structures C and D:

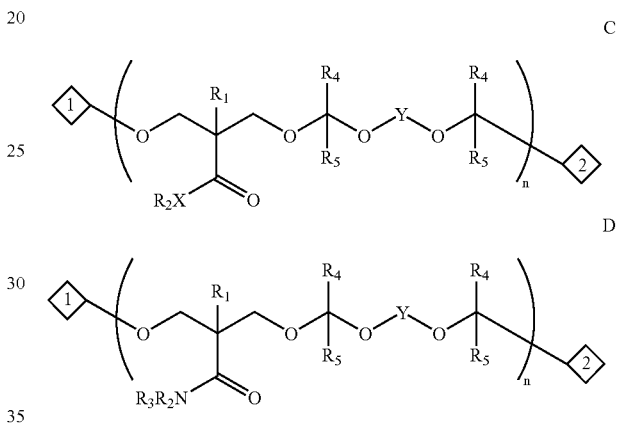

In structures C and D, n is an integer that is preferably greater than about 3, more preferably n is greater than about 10; X is O or N; $R_1$ is selected from the group consisting of $C_1$-$C_{18}$ alkoxy, $C_1$-$C_{18}$ alkyl, $C_1$-$C_{18}$ alkylamine, $C_1$-$C_{18}$ alkylammonium, $C_1$-$C_{18}$ fluoroalkyl, $C_6$-$C_{10}$ aryl, $C_6$-$C_{10}$ aryloxy, $C_7$-$C_{20}$ alkylaryl, $C_7$-$C_{20}$ alkylaryloxy, $C_7$-$C_{20}$ arylalkylamine, $C_7$-$C_{20}$ arylalkylammonium and —$(CH_2CH_2O)_x CH_3$ ($1 \leq x \leq 18$); Y and $R_4$ are each independently selected from the group consisting of $C_1$-$C_{18}$ alkoxy, $C_1$-$C_{18}$ alkyl, $C_1$-$C_{18}$ fluoroalkyl, $C_6$-$C_{10}$ aryl, $C_6$-$C_{10}$ aryloxy, $C_7$-$C_{20}$ alkylaryl, $C_7$-$C_{20}$ alkylaryloxy, —$(CH_2CH_2O)_x CH_3$ ($1 \leq x \leq 18$); $R_5$ is selected from the group consisting of H, $C_1$-$C_{18}$ alkoxy, $C_1$-$C_{18}$ alkyl, $C_1$-$C_{18}$ fluoroalkyl, $C_6$-$C_{10}$ aryl, $C_6$-$C_{10}$ aryloxy, $C_7$-$C_{20}$ alkylaryl, $C_7$-$C_{20}$ alkylaryloxy, —$(CH_2CH_2O)_x CH_3$ ($1 \leq x \leq 18$); and $R_2$ and $R_3$ are each independently selected from the group consisting of H, linear poly(ethyleneimine), branched poly(ethyleneimine), linear poly(propyleneimine), branched poly(propyleneimine), alkylamine, dialkylamine, trialkylamine, tetraalkylammonium, arginine, asparagine, glutamine, histidine, lysine, polylysine and proline.

Copolymers comprising recurring units of the structure D may be prepared from corresponding copolymers comprising recurring units of the structure C wherein $R_2$ is methyl by amidation of the methyl ester. Methods for amidation of methyl esters are known to those skilled in the art and include, for example, heating the methyl ester with an alkyl- or dialkylamine.

The structures of linear poly(ethyleneimine), branched poly(ethyleneimine), linear poly(propyleneimine), branched poly(propyleneimine) and polylysine will depend on the methods used to prepare them as generally understood by those skilled in the art. Linear poly(ethyleneimine) is generally described by the chemical formula $(CH_2CH_2NH)_n$ $(CH_2CH_3)_2$ where n is greater than about 10. Branched poly(ethyleneimine) is generally described by the chemical formula $(CH_2CH_2N)_k(CH_2CH_2NH)_m(CH_2CH_2NH_2)_n$ where k+m+n is greater than about 10. Linear and branched poly(propyleneimine) are similarly generally described by the chemical formulas $(CH_2CH_2CH_2NH)_n(CH_2CH_2CH_3)_2$ and $(CH_2CH_2CH_2N)_k(CH_2CH_2CH_2NH)_m$ $(CH_2CH_2CH_2NH_2)_n$, respectively.

For the purpose of transfection, there is generally a direct relationship between the molecular weight of a polyalkylamine and its cytotoxicity. It is therefore preferred that the molecular weight of the polyamine portion of the photocleavable DNA transfer agent be less than about 30,000 Daltons, more preferably less than about 1800 Daltons.

In a more preferred embodiment, the acid sensitive gene-transfer agent comprises a copolymer comprising a repeat unit of structure D wherein $R_1$ and $R_4$ are methyl, $R_2$ and $R_3$ are selected from the group consisting of linear poly(ethyleneimine) with $M_w$ greater than about 500, branched poly(ethyleneimine) with $M_w$ greater than about 500, linear poly(ethylene[tetraalkyliminium]) with $M_w$ greater than about 500, and branched poly(ethylene[tetraalkyliminium]) with $M_w$ greater than about 500; $R_5$ is H; and Y is selected from the group consisting of $C_1$-$C_{18}$ alkyl and $(-CH_2CH_2O)_xCH_2CH_2-$ $(1 \leq x \leq 18)$.

Poly(ethylene[tetraalkyliminium]) may be prepared from poly(ethyleneimine) by treatment with an appropriate electrophilic alkylating agent. Electrophilic alkylating agents for amines are known to those skilled in the art, and can include, for example, methyl iodide, methyltriflouromethylsulfonate, benzylbromide, and dimethyl sulfate.

In a most preferred embodiment, the polyacetal is poly(3-ethoxy-2-{1-[2-(2-isopropoxy-ethoxy)-ethoxy]-ethoxymethyl}-2-methyl-propionic acid amide) and $R_2R_3N$ is a linear poly(ethyleneimine) with a molecular weight between about 500 Daltons and about 1800 Daltons.

Preparation of the most preferred acid sensitive gene-transfer agent is described in U.S. patent application Ser. No. 10/375,705 now issued as U.S. Pat. No. 6,878,374 which is hereby incorporated by reference in its entirety and particularly for the purpose of describing acid sensitive gene-transfer agent and methods for making them.

Photoacid generators (PAGs) are chromophores which produce a Brønsted or Lewis acid when irradiated with ultraviolet or visible light. Structures of PAGs and families of photoacid generating materials are known to those skilled in the art. A more detailed description of photoacid generators is provided in M. Shirai and M. Tsunooka, "Photoacid and photobase generators: chemistry and applications to polymeric materials" Prog. Polym. Sci. vol. 21 pp 1-45, 1996, which is hereby incorporated by reference. Photoacid generators are typically divided into two categories: neutral and cationic photoacid generators. Examples of suitable cationic photoacid generators include aryldiazonium, trialkylsulfonium, aryldialkyl sulfonium, diarylalkyl sulfonium, triarylsulfonium, dialkyl(hydroxyaryl)sulfonium, thiophenium and diaryliodonium. Preferably, the alkyl and aryl groups of the aforementioned are each independently selected from the group consisting of $C_1$-$C_{18}$ alkoxy, $C_1$-$C_{18}$ alkyl, $C_1$-$C_{18}$ fluoroalkyl, $C_6$-$C_{10}$ aryl, $C_6$-$C_{10}$ aryloxy, $C_7$-$C_{20}$ alkylaryl, and $C_7$-$C_{20}$ alkylaryloxy.

Examples of suitable neutral photoacid generators include triazines, iminosulfonates, 2-nitrobenzyl esters, 2,4-dinitrobenzyl esters, 4-nitrobenzyl esters, 2,6-dinitrobenzyl esters, arylsulfones, diaryldisulfones, N-hydroxyimide sulfonates, diazonapthoquinones, pyrogallolsulfonate esters, benzoin esters, dimethoxy benzoin esters, aryloxime esters. Esters are condensation products of an alcohol and an acid. Preferably the portion of each ester derived from an acid is selected from the group consisting of carboxylate and sulfonate with the respective general formulae: $-OC(O)R_1$ and $-OS(O)_2R_2$. Preferably $R_1$ and $R_2$ are independently chosen from the group consisting of H, $C_1$-$C_{18}$ alkoxy, $C_1$-$C_{18}$ alkyl, $C_1$-$C_{18}$ fluoroalkyl, $C_6$-$C_{10}$ aryl, $C_6$-$C_{10}$ aryloxy, $C_7$-$C_{20}$ alkylaryl, and $C_7$-$C_{20}$ alkylaryloxy.

Photosensitizers are included in preferred compositions to provide sensitivity to visible and infrared light. Photosensitizers are dyes that absorb light at a wavelength of interest. Examples of photosensitizing dyes include thioxanthene dyes, xanthene dyes, ketone dyes, pyromethine dyes, thiopyrylium salt dyes, bisstyryl benzene dyes, merocyanine dyes, coumarin dyes, fluorescin dyes, cyanine dyes, thiazine dyes, phenothiazine dyes, coronene dyes, benzanthracene dyes, perylene dyes, ketocoumarin dyes, fumarine dyes, acridine dyes, borate dyes, benzofuran dyes and other fluorescent or phosphorescent photosensitizing dyes. Preferred sensitizing dyes are perylene (I) and pyrromethene (II) dyes as follows in which $R_1$ and $R_2$ are each independently selected from the group consisting of H, $C_1$-$C_{18}$ alkyl, $C_6$-$C_{10}$ aryl and $(-CH_2CH_2O)_xCH_3$ $(1 \leq x \leq 18)$.

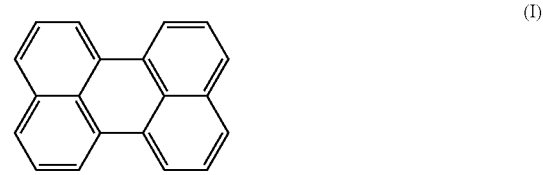

(I)

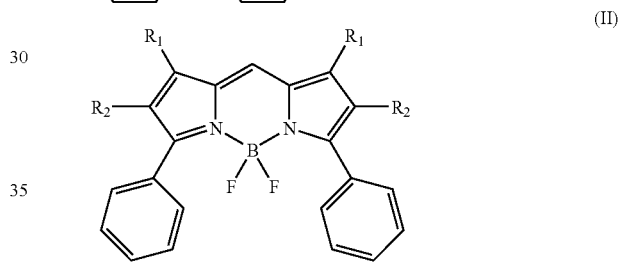

(II)

Preparation of photocleavable DNA transfer compositions: The photocleavable DNA transfer compositions are preferably prepared by mixing aliquots of the DNA of interest, photoacid generator solution, acid-sensitive gene transfer agent, and optionally, photosensitizer. Preferably the acid sensitive gene-transfer agent is comprised of a mixture of acid sensitive polymer and DNA as described in U.S. patent application Ser. No. 10/375,705, filed Feb. 25, 2003, now issued as U.S. Pat. No. 6,878,374 which is hereby incorporated by reference. The DNA of interest may be mixed with the other constituents of the photocleavable DNA transfer composition at the time of preparation or at any time prior to use.

It is preferred that the concentration of DNA in the photocleavable DNA transfer composition be less than or equal to the concentration of acid-sensitive gene transfer agent. Preferably the DNA concentration in the photocleavable DNA transfer composition is less than about 50% than that of the acid-sensitive gene transfer agent by weight, more preferably less than about 20% by weight, most preferably less than about 7% by weight.

It is preferred that the concentration of the acid-sensitive gene transfer agent in the photocleavable DNA transfer composition be less than about 1 mg/mL, preferably less than about 200 microgram/mL, most preferably between about 20 microgram/mL and 100 microgram/mL.

In a preferred embodiment, the photocleavable DNA transfer composition comprises between about 2.0% and 0.05% photoacid generator, by weight based on the weight of the acid-sensitive gene transfer agent. Most preferably the concentration of photoacid generator is between about 0.3 wt % and 0.1 wt %, based on the weight of the acid-sensitive gene transfer agent.

Photosensitizers may be included in the photocleavable DNA transfer composition to increase the sensitivity of the photocleavable DNA transfer composition to visible light. Preferably the molar ratio of photosensitizer to photoacid generator in the photocleavable DNA transfer composition is in the range 0.1 to 10, more preferably 0.5 to 2.0. The most preferable molar ratio of photosensitizer to photoacid generator is 1.1.

It is preferred that the photocleavable DNA transfer composition be prepared from water or buffered aqueous solutions of photoacid generator solution, acid-sensitive gene transfer agent, and optionally, photosensitizer. Photocleavable DNA transfer compositions prepared in this manner can be used directly in the aqueous solution or isolated by lyophilization. Optionally, the photocleavable DNA transfer composition may be prepared from components dispersed in a water soluble cosolvent such as DMSO, ethanol or glyme. One or more components may also be dissolved in a relatively water-insoluble solvent such as diethyl ether or dichloromethane. Compositions prepared from components dissolved in relatively immiscible solvents such as diethyl ether and water are preferably prepared by shaking the two solutions together and isolating the water soluble components. Compositions prepared from components dissolved entirely in water-insoluble solvents are preferably prepared by vigorously mixing the components, then removing the solvents under reduced pressure.

Photosensitizers are preferably chosen by considering the following: The mechanism of photoacid generation varies widely in detail, but the overall process is the similar for most systems. Generally, the absorption of a photon causes a weak bond to break in a photoacid generator. Rearrangement or proton abstraction from solvent then yields a proton. Bond cleavage can be initiated by direct excitation of the photoacid generator, by direct energy transfer from a sensitizer or by electron transfer. Saeva has shown that one-electron reduction of sulfonium salts leads to efficient acid production. See Saeva, F. D. and B. P. Morgan (1984) J. Am. Chem. Soc. 106: 4121.

Direct energy transfer can occur if the absorption envelope of the sensitizer overlaps the absorption envelope of the photoacid generator. Electron transfer can occur if the excited state ionization potential of the sensitizer is less than the electron affinity of the photoacid generator. In the absence of measured excited state ionization potentials, the ability of the excited state to act as a donor can be estimated from the spectrochemical and electrochemical data.

The excited state oxidation potential can be determined from electrochemical data using equation (1), where $E^*$ is the 0,0 energy in eV and $E_{ox}(S^0)$ is the ground state oxidation potential:

$$E_{ox}(S^1) = E_{ox}(S^0) + E^* (\text{in } eV) \qquad (1)$$

The 0,0 energy is the energy difference between the lowest lying vibrational level of the ground state and the lowest lying vibrational level of the excited state. If both the absorption and fluorescence spectra are available, the 0,0 energy is energy at which the two spectra intersect. An estimate of the 0,0 energy can be obtained from the emission maximum and absorption maximum data using equation (2), where $\lambda_{max}(abs)$ and $\lambda_{max}(fl)$ are the absorption and emission maxima, respectively, expressed in eV:

$$E_{0,0} = (\lambda_{max}(abs) + \lambda_{max}(fl))/2 \qquad (2)$$

The excited state oxidation potentials have been calculated for some example dyes (Table 1).

TABLE 1

Calculated excited state oxidation potentials for sample photosensitizing dyes.

| Dye | $\lambda_{max}$ (nm) | $\lambda_{max}$ emission (nm) | $E^{1/2}(S_0)$ v/s Fc/Fc$^+$ (V) | $E^{1/2}(S_1)$ v/s Fc/Fc$^+$ (V) |
|---|---|---|---|---|
| III | 319 | 399 | +0.020 | −3.47 |
| IV | 359 | 408 | +0.315 | −2.91 |
| V | 374 | 410 | −0.035 | −3.20 |
| VI | 387 | 427 | +0.305 | −2.74 |
| VII | 472 | 525 | +0.535 | −1.9 |

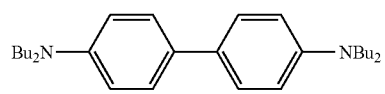

(III)

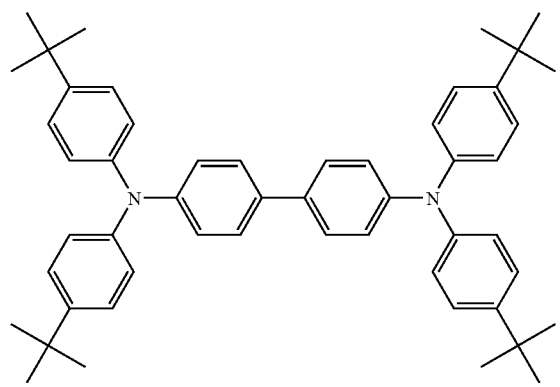

(IV)

-continued

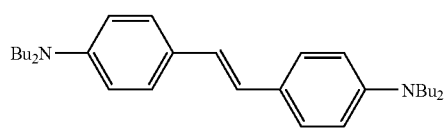
(V)

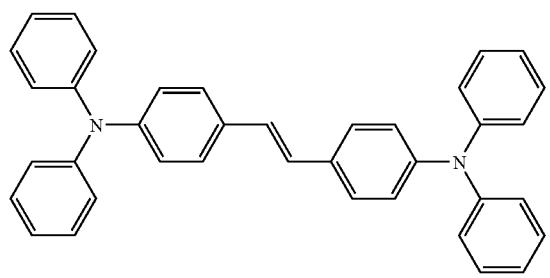
(VI)

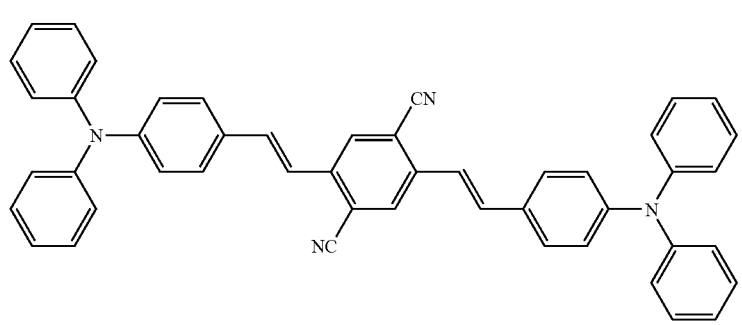
(VII)

The effect of UV (365 nm) light on neat samples of a polyacetal and composites of polyacetal and PAG have been examined, as well as the effect of visible light on the same samples doped with perylene as a visible sensitizer (FIG. 1).

EXAMPLES

Photoacids and PAGs were purchased from Midori-Kagaku. The acid sensitive acetal-ester polymer (VIII) was prepared as described in U.S. patent application Ser. No. 10/375,705, filed Feb. 25, 2003, which is hereby incorporated by reference. All experiments were performed in $CDCl_3$ at room temperature. Depolymerization was qualitatively detected by $^1H$ NMR and confirmed by high pressure size exclusion chromatography analysis (refractive index detector).

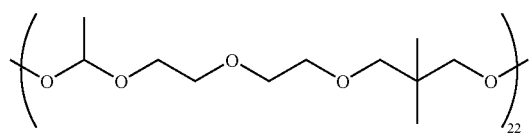
(VIII)

The five individual photoacid generators having the structures IX-XIIV as shown below were used in these examples. Perylene (I) was used as the visible sensitizer. Many other photoacid generators and photointiating species are available.

Examples 1-11

An aliquot of acid sensitive acetal-ester polymer (VIII, 50 mg) was dissolved in 1.2 mL $CDCl_3$. An aliquot (0.05 mL) of a solution of photoacid generator (5 mg in 1 mL $CDCl_3$, total concentration of photoacid generator ~0.01 wt %) and/or (I) (0.2 wt %) was added to the solution of polymer. In the case of visibly sensitized samples, both photoacid generator and photosensitizer (I) were maintained at 0.2 wt %. The sample was shaken at room temperature, and the $^1H$ NMR spectrum was obtained. The sample was then allowed to stand overnight in the dark. A $^1H$ NMR spectrum was again obtained. Finally, the sample was irradiated with either UV (254 nm) light, solar light or 420 nm visible light and a final $^1H$ NMR spectrum was obtained. The growth of an aldehyde proton peak at ~9.5 ppm along with sharpening of the strong signals at 3.8 and 1.2 ppm provides evidence for cleavage of the polymer.

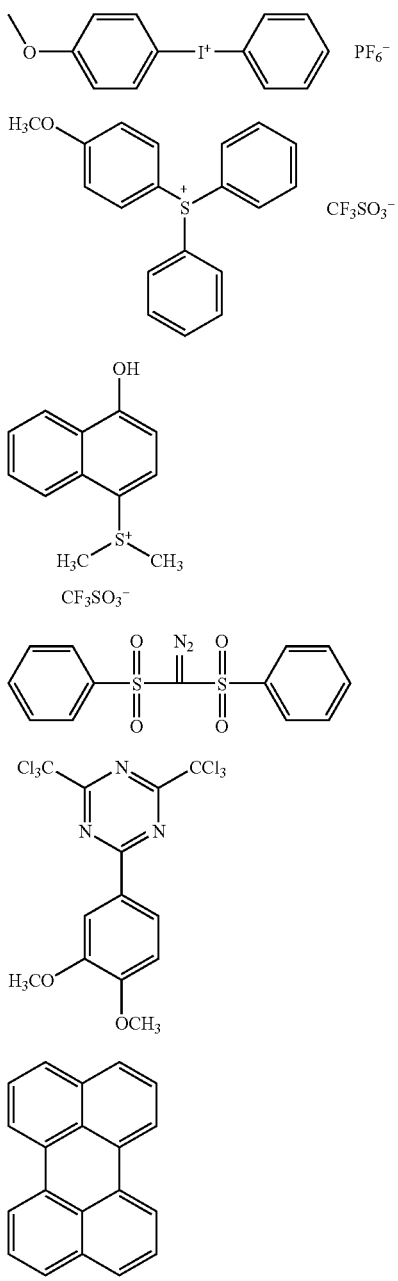

Figure 2A:
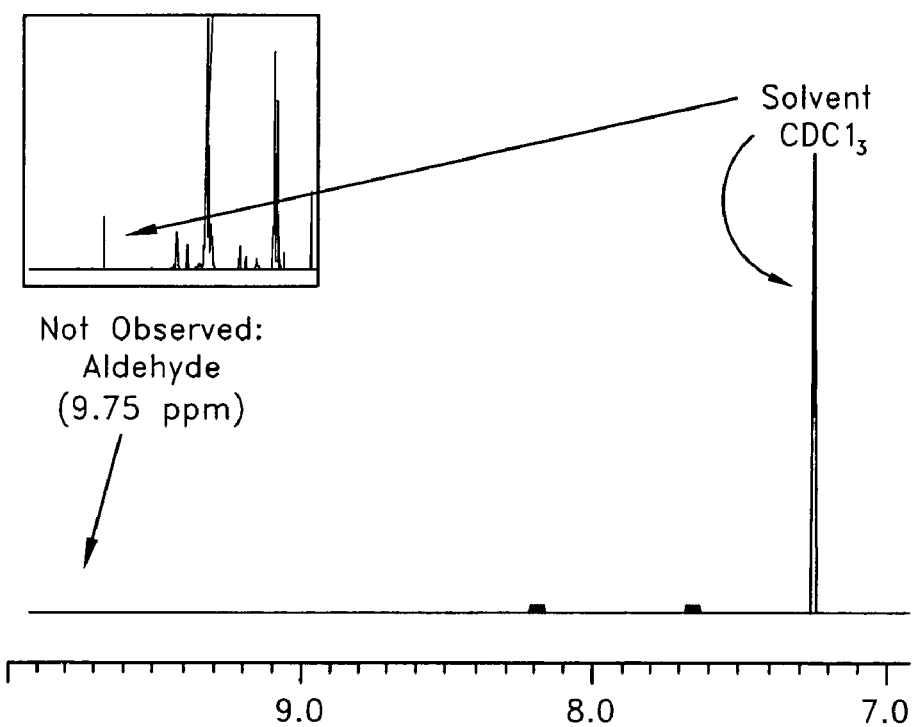
FIGS. 2A and 2B show blowups of the low field region of the $^1$H NMR spectrum of the composition of Example 10 before (FIG. 2A) and after (FIG. 2B) visible light irradiation. The inserts show the entire $^1$H NMR spectrum.
Figure 2B:
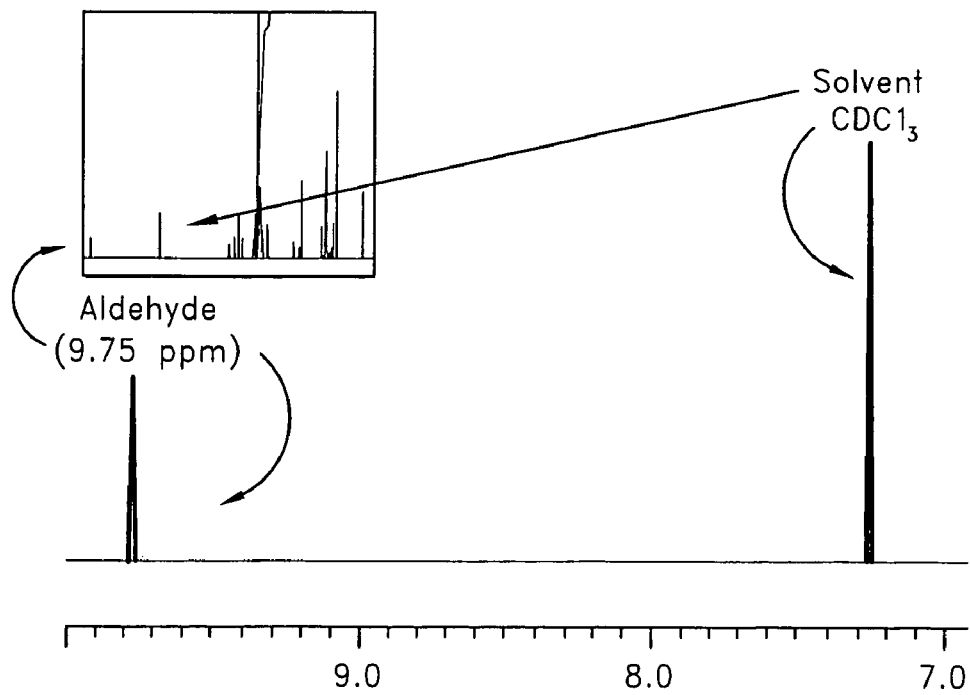

In Examples 1-9 containing only a photoacid generator IX-XIIV, no polymer chain cleavage was found to occur on prolonged standing (up to 5 days) in the dark at room temperature. However, when the samples were exposed to solar irradiation or UV irradiation, the aldehyde peak at 9.76 ppm appeared, and the broad peaks at high field typical of polymeric ethers were observed to sharpen considerably. The sample containing sulfonium salt XI (Example 7) did not undergo acid catalyzed polymer chain cleavage on exposure to sunlight. However, on exposure of the above sample to 254 nm irradiation for 10 minutes, partial polymer chain cleavage was observed to occur. This sample was allowed to stand, in the dark, for 12 hours. Following this, significant sharpening of the high field peaks, disappearance of a peak at 4.7 ppm and a large increase in the aldehyde signal was observed (FIG. 2). This observation is consistent with the formation of a persistent, strong acid in very small quantities. Example 10, containing both photoacid generator and photosensitizer (I) was observed to undergo substantially complete polymer chain cleavage after illumination with visible (420 nm) light. Example 11 is the same composition as Example 10 with the exception that no photosensitizer was added. Example 11 did not undergo acid catalyzed cleavage upon irradiation with 420 nm light.

A mixture was prepared where polyacetal (VIII) in CDCl$_3$ was doped with both (XIII) (0.2 wt %) and (I) (0.2 wt %). It was observed that upon irradiation at 420 nm, the (XIII)/(I) doped polyacetal (VIII) (example 10) underwent photoinduced degradation at a similar rate to the UV irradiated example 9. A negative control sample was also prepared where the polyacetal (VIII) was doped with perylene but not photoacid generator. Irradiation of the excitation band of (I) at 420 nm did not result in the degradation of the polymer.

TABLE 2

Summary of Examples

| EXAMPLE | Radiation | Dark rxn?[a] | Light rxn?[b] | Mw[c] |
|---|---|---|---|---|
| 1 Control - no photoacid generator | Solar | − | − | 6392 |
| 2 Control - no photoacid generator | UV - 254 nm | − | − | — |
| 3 Control - (I) only (no photoacid generator) | 410 nm | − | − | — |
| 4 (IX) only | Solar | − | + | <300 |
| 5 (X) only | Solar | − | + | <300 |
| 6 (X) only | UV - 254 nm | − | + | — |
| 7 (XI) only | Solar | − | − | 6392 |
| 8 (XII) only | Solar | − | + | <300 |
| 9 (XIII) only | Solar | − | + | <300 |
| 10 (XIII) and (I) | Visible (420 nm) | − | + | — |
| 11 (XIII) only | Visible (420 nm) | − | + | — |

[a]Dark reaction: "−" indicates no polymer chain cleavage for virgin samples stored in the dark at 25° C. for up to 12 weeks as evidenced by no appearance of an aldehyde peak in the $^1$H NMR spectrum of the mixture.
[b]Light reaction: "+" indicates that polymer chain cleavage occurs after irradiation as evidenced by the appearance of an aldehyde peak in the $^1$H NMR spectrum of the mixture.
[c]Mw: Estimated weight average molecular weight of the polymer (VIII) after irradiation.
Data marked "—" were not obtained It will be appreciated by those skilled in the art that various omissions, additions and modifications may be made to the processes described above without departing from the scope of the invention, and all such modifications and changes are intended to fall within the scope of the invention, as defined by the appended claims.

What is claimed is:

1. A photocleavable DNA transfer composition comprising:
    a) an acid sensitive polymer comprising a repeat unit selected from the group consisting of (3-ethoxy-2-{1-[2-(2-isopropoxy-ethoxy)-ethoxy]-ethoxymethyl}-2-methyl-propionic acid amide) and (3-ethoxy-2-{1-[2-(2-isopropoxy-ethoxy)-ethoxy]-ethoxymethyl}-2-methyl-propionic acid ester);
    b) a photoacid generator; and
    c) a bioactive agent, wherein the bioactive agent is a polynucleotide.

2. The composition of claim 1 wherein the polynucleotide is DNA.

3. The composition of claim 1 wherein the polynucleotide is RNA.

4. The composition of claim 1 further comprising a photosensitizer.

5. The composition of claim 1 wherein the acid sensitive polymer further comprises repeat units that are cations.

6. The composition of claim 5 wherein the cations comprise an organic amine or amino acid.

7. The composition of claim 6 wherein the organic amine or amino acid is selected from the group consisting of alkylamine, dialkylamine, trialkylamine, tetraalkylammonium, arginine, asparagine, glutamine, histidine, lysine, and proline.

8. The composition of claim 6 wherein the organic amine is a polyamine.

9. The composition of claim 1 wherein the acid sensitive polymer comprises a graft copolymer of polyalkylamine and polyacetal, wherein the polyacetal comprises the repeat unit.

10. The composition of claim 9 wherein the polyalkylamine has a molecular weight greater than about 100 Daltons and less than about 30,000 Daltons.

11. The composition of claim 10 wherein the polyalkylamine is selected from the group consisting of linear poly(ethyleneimine), branched poly(ethyleneimine), linear poly(propyleneimine), branched poly(propyleneimine) and polylysine.

12. The composition of claim 11 wherein the linear poly(ethyleneimine) has a molecular weight between about 500 Daltons and about 1800 Daltons.

13. The composition of claim 1 wherein the photoacid generator is a cationic photoacid generator selected from the group consisting of aryldiazonium, trialkylsulfonium, aryldialkyl sulfonium, diarylalkyl sulfonium, triarylsulfonium, dialkyl(hydroxyaryl)sulfonium, thiophenium and diaryliodonium.

14. The composition of claim 13 wherein the diaryliodonium is a diphenyl iodonium salt.

15. The composition of claim 13 wherein the diaryliodonium is (phenyl)(4-methoxyphenyl)iodonium bromide.

16. The composition of claim 1 wherein the photoacid generator is a neutral photoacid generator selected from the group consisting of triazine, iminosulfonate, 2-nitrobenzyl ester, 2,4-dinitrobenzyl ester, 4-nitrobenzyl ester, 2,6-dinitrobenzyl ester, arylsulfone, diaryldisulfone, N-hydroxyimide sulfonate, diazonapthoquinone, pyrogallolsulfonate ester, benzoin ester, dimethoxy benzoin ester and aryloxime ester.

17. The composition of claim 16 wherein the triazine is a 4,6-bis-trichloromethyl-[1,3,5]triazine.

18. The composition of claim 17 wherein the 4,6-bis-trichloromethyl-[1,3,5]triazine is 2-(3,4-dimethoxy-phenyl)-4,6-bis-trichloromethyl-[1,3,5]triazine.

19. The composition of claim 1 that is sensitive to light with a wavelength longer than 400 nm.

20. The composition of claim 4 wherein the photosensitizer is selected from the group consisting of a thioxanthene dye, a xanthene dye, a ketone dye, a pyrromethene dye, a thiopyrylium salt dye, a bisstyryl benzene dye, a merocyanine dye, a coumarin dye, a fluorescin dye, a cyanine dye, a thiazine dye, a phenothiazine dye, a coronene dye, a benzanthracene dye, a perylene dye, a ketocoumarin dye, a fumarine dye, an acridine dye, a borate dye, and a benzofuran dye.

21. The composition of claim 20 wherein the photosensitizer is a perylene dye.

22. The composition of claim 20 wherein the photosensitizer is a pyrromethene dye.

* * * * *